United States Patent [19]
Miyazaki et al.

[11] Patent Number: 5,882,371
[45] Date of Patent: Mar. 16, 1999

[54] METHOD FOR HEAT-TREATING A GLASS SUBSTRATE

[75] Inventors: Seiji Miyazaki; Manabu Nishizawa; Kei Maeda, all of Yokohama, Japan

[73] Assignee: Asahi Glass Company Ltd., Tokyo, Japan

[21] Appl. No.: 891,032

[22] Filed: Jul. 10, 1997

[30] Foreign Application Priority Data

Jul. 12, 1996 [JP] Japan ................................ 8-183804

[51] Int. Cl.$^6$ .................................................. C03B 32/00
[52] U.S. Cl. .................................................. 65/111; 65/117
[58] Field of Search ................................ 65/29.1, 29.11, 65/33.1, 111, 117, 118, 119

[56] References Cited

U.S. PATENT DOCUMENTS

| | | | |
|---|---|---|---|
| 4,361,428 | 11/1982 | Bartusel et al. | 65/29.18 |
| 5,236,488 | 8/1993 | Vehmas | 65/114 |
| 5,597,395 | 1/1997 | Bocko et al. | 65/33.4 |
| 5,643,649 | 7/1997 | Hagan et al. | 428/64.1 |
| 5,674,304 | 10/1997 | Fukada et al. | 65/32.4 |
| 5,676,722 | 10/1997 | Seidel et al. | 65/111 |

*Primary Examiner*—Stanley S. Silverman
*Assistant Examiner*—Sean Vincent
*Attorney, Agent, or Firm*—Oblon, Spivak, McClelland, Maier & Neustadt, P.C.

[57] ABSTRACT

In each of the second and subsequent heat treatments, in a case where a glass substrate shrinks by heat treatment at the same average cooling rate as the average cooling rate in the immediately preceding heat treatment, the average cooling rate is set to be larger than that in the immediately preceding heat treatment, and inversely, in a case where the glass substrate extends, the average cooling rate is set to be smaller than that in the immediately preceding heat treatment.

16 Claims, No Drawings

METHOD FOR HEAT-TREATING A GLASS SUBSTRATE

BACKGROUND OF THE INVENTION

1. Field of the Invention

The present invention relates to a method for heat treatment of a glass substrate suitable for the production of a display panel such as a plasma display panel or a liquid crystal display panel.

2. Prior Art

The production of a plasma display panel (hereinafter referred to as PDP) includes a step for laminating or forming a laminate such as an electrode material, a dielectric material, a diaphragm or a fluorescent material on a glass substrate by means of screen printing or photolithographic technique. In such a forming step, it is usually necessary to heat-treat each laminate at a temperature of from 500° to 600° C. in order to dry and sinter the material laminated on the substrate. Namely, the substrate will be subjected to heating and cooling repeatedly.

It is generally known that glass undergoes a change in the specific volume by heat treatment. Due to such a dimensional change of glass, deviation of the laminated material from the pattern is likely to result, the operation efficiency for bonding the front substrate and the rear substrate tends to deteriorate, or a cross talk is likely to take place in the display.

Heretofore, in order to suppress extension or shrinkage of glass during such heat treatment, it has been common to use a glass having high strain point, or to stabilize extension or shrinkage of glass by pre-heat treatment i.e. by preliminarily heat treating the glass in a pattern close to the temperature conditions for heat treatment. However, even when a glass having a high strain point is used, such extensibility or shrinkage of glass can not completely be removed. The pre-heat treatment is effective to some extent when the heat treatment step is only once during the production of a panel, but when heat treatment is repeated a plurality of times, it is difficult to suppress extension or shrinkage of glass in the second and subsequent heat treatments, since the degree of extensibility or shrinkage differs in every heat treatment.

On the other hand, in recent years, along with the progress in sophistication of picture elements of a display, an improvement in precision of a film-forming technique is required, and an improvement of dimensional stability during heat treatment of glass has been increasingly important.

The present invention is intended to solve the above-mentioned problems of the prior art and to present a technical means to control extensibility and shrinkage of glass during heat treatment of a glass substrate.

SUMMARY OF THE INVENTION

The present invention has been made to solve the above problems, and it is a method for heat treatment of a glass substrate, which comprises heat treating a glass substrate a plurality of times, wherein in each of the second and subsequent heat treatments, the cooling rate for cooling from a temperature maintained for a predetermined period of time for heat treatment is differentiated from the cooling rate in the immediately preceding heat treatment so as to control the absolute value for the degree of extensibility or shrinkage of the glass substrate after the heat treatment.

One embodiment of the present invention is directed to a method for heat treatment of a glass substrate, which comprises heat treating a glass substrate a plurality of times at a temperature exceeding 400° C., wherein in each of the second and subsequent heat treatments, the average cooling rate for cooling to 400° C. from a temperature maintained for a predetermined period of time for heat treatment (hereinafter referred to as "the average cooling rate to 400° C.") is set so that the absolute value for the degree of extensibility or shrinkage of the glass substrate becomes smaller than in a case of heat treatment at the same rate as the average cooling rate to 400° C. in the immediately preceding heat treatment.

In particular, in each of the second and subsequent heat treatments, in a case where the glass substrate shrinks by heat treatment at the same average cooling rate to 400° C. as the average cooling rate to 400° C. in the immediately preceding heat treatment, the average cooling rate to 400° C. is set to be larger than that in the immediately preceding heat treatment, and in a case where the glass substrate extends by heat treatment at the same average cooling rate to 400° C. as the average cooling rate to 400° C. in the immediately preceding heat treatment, the average cooling rate to 400° C. is set to be smaller than that in the immediately preceding heat treatment.

Further, another embodiment of the present invention is directed to a method for heat treatment of a glass substrate, which comprises heat treating a glass substrate a plurality of times at a temperature exceeding 300° C., wherein in each of the second and subsequent heat treatments, the average cooling rate for cooling to 300° C. from a temperature maintained for a predetermined period of time for heat treatment (hereinafter referred to as "the average cooling rate to 300° C.") is set so that the absolute value for the degree of extensibility or shrinkage of the glass substrate becomes smaller than in a case of heat treatment at the same rate as the average cooling rate to 300° C. in the immediately preceding heat treatment.

In particular, in each of the second and subsequent heat treatments, in a case where the glass substrate shrinks by heat treatment at the same average cooling rate to 300° C. as the average cooling rate to 300° C. in the immediately preceding heat treatment, the average cooling rate to 300° C. is set to be larger than that in the immediately preceding heat treatment, and in a case where the glass substrate extends by heat treatment at the same average cooling rate to 300° C. as the average cooling rate to 300° C. in the immediately preceding heat treatment, the average cooling rate to 300° C. is set to be smaller than that in the immediately preceding heat treatment.

According to the present invention, the degree of extensibility or shrinkage of the glass substrate is controlled by the cooling rate in the heat treatment (i.e. in the cycle of the temperature raising-temperature maintaining-cooling), whereby the degree of extensibility or shrinkage of the glass substrate in each heat treatment step can be suppressed to minimum even when heat treatment is repeated a plurality of times.

Here, as the cooling rate, the average cooling rate for cooling to 400° C. from a temperature maintained for heat treatment (i.e. an average cooling rate to 400° C.) is important in a case where heat treatment is carried out at a relatively high temperature (for example, a temperature exceeding 400° C., particularly 500° C.) as in the case of producing PDP or polysilicon TFT. On the other hand, the cooling rate at a temperature of lower than 400° C. is less influential over the degree of extensibility or shrinkage of the glass substrate.

On the other hand, in an application where it is required to minimize the absolute value for the degree of extensibility or shrinkage of a substrate during heat treatment, even if heat treatment is carried out at a relatively low temperature (for example, from 300° to 450° C.) as in the case of producing a liquid crystal display panel other than polysilicon TFT, the average cooling rate for cooling to room temperature from a temperature maintained for heat treatment (i.e. the average cooling rate to room temperature) becomes important.

Further, in such an application where it is required to minimize the absolute value for the degree of extensibility or shrinkage of a glass substrate during required heat treatment, even if heat treatment is carried out at a low temperature (at most 400° C.) as in the case of producing a liquid crystal display panel, the purpose of the present invention can be accomplished by carrying out an extreme operation such as placing the glass substrate of room temperature on an already heated hot plate or inversely dismounting it from a hot plate.

In the present specification, the average cooling rate to 400° C. and the average cooling rate to room temperature may generally be referred to simply as the average cooling rate. Further, the temperature maintained for heat treatment (the maximum temperature) will be referred to as the heat treating temperature.

PREFERRED EMBODIMENTS

As an embodiment of the present invention, a case will be described in which a glass substrate is heat treated twice under the same conditions with respect to the temperature raising rate, the heat treating temperature and the temperature maintaining period of time for heat treatment.

Even if heat treatments are carried out while controlling the heat treatment temperature profile to be completely the same as in this case, it may often happen that, for example, while the glass substrate extends at a level of 5 ppm in the first heat treatment, the glass substrate shrinks at a level of 18 ppm in the next heat treatment.

Therefore, in the present invention, in the second and subsequent heat treatments, the average cooling rate is adjusted. In this manner, it is possible to suppress the change in the degree of extensibility or shrinkage and the absolute degree of extensibility or shrinkage in one heat treatment. In many cases, it is possible to suppress the absolute value for the degree of extensibility or shrinkage by the second heat treatment to the same level as the absolute value for the degree of extensibility or shrinkage by the first heat treatment, by adjusting the average cooling rate in the second heat treatment to be larger than the average cooling rate in the first heat treatment.

In general, in a case where the glass substrate shrinks by the second heat treatment conducted at the same cooling rate as in the first heat treatment, it is possible to suppress the degree of extensibility or shrinkage to an absolute value of a level equal to that in the first heat treatment by adjusting the average cooling rate in the second heat treatment to be larger than the first heat treatment, and inversely, in a case where the glass substrate extends by the second heat treatment at the same cooling rate as in the first heat treatment, it is possible to suppress the degree of expansibility or shrinkage to an absolute value of a level equal to that in the first heat treatment by adjusting the average cooling rate in the second heat treatment to be smaller than in the first heat treatment.

The reason as to why the absolute value for the degree of extensibility or shrinkage of a glass substrate can be suppressed in a case where heat treatment is carried out a plurality of times as in the present invention, is considered to be as follows. The reason as to why glass shrinks substantially when treated in the second heat treatment with the same temperature profile as in the first heat treatment as in the above embodiment, is considered to be such that the glass has become close to an equilibrium state (the state where the density is highest) by the temperature rise during the heat treatment. Accordingly, in such a case, it may be cooled while maintaining the extended state of glass during the temperature rise to some extent. Namely, it is effective to adjust the average cooling rate in the second heat treatment to be larger than in the first heat treatment for suppressing the shrinkage of the glass.

Inversely, the reason as to why the glass extends substantially when heat-treated in the second heat treatment with the same temperature profile as in the first heat treatment, is considered to be such that during the heat treatment, the glass has departed from the equilibrium state. In such a case, the average cooling rate in the second heat treatment may be made smaller than in the first heat treatment, so that the glass substrate will be close to the equilibrium state as far as possible.

Namely, in each of the second and subsequent heat treatments, if the cooling rate for the heat treatment is set so that the stress in the glass substrate relaxed by the temperature rise and the temperature maintenance in the heat treatment, is balanced with the stress generated during cooling in the heat treatment, the degrees of extensibility or shrinkage of the substrate in both steps are canceled out, whereby the absolute value for the degree of extensibility or shrinkage of the glass substrate can be suppressed.

For example, in a case where in a plurality of heat treatments, the same temperature profile including the temperature raising rate, the heat treating temperature, the temperature maintaining period of time and the cooling rate in each heat treating step, is employed, the glass approaches the equilibrium state at the time of every heat treatment. Accordingly, in order to make the degree of extensibility or shrinkage in each heat treatment constant, it is preferred to gradually increase the average cooling rate for every heat treatment.

Further, in a case where the second heat treatment profile is substantially the same as in the first heat treatment, and only the heat treating temperature maintaining period of time is long, the glass will rapidly approach the equilibrium state. Accordingly, in order to make the degree of extensibility or shrinkage in each heat treatment constant, it is necessary to cool the glass substantially more quickly in the second heat treatment than in the first heat treatment. This average cooling rate will be larger than the average cooling rate required to control the absolute value for the degree of extensibility or shrinkage in a case where the heat treating temperature maintaining period of time is the same in the respective heat treatments.

On the other hand, in a case where the heat treating temperature in the second heat treatment step is higher than the heat treating temperature in the first heat treatment step, if the same temperature raising rate and cooling rate are employed, by the second heat treatment, the glass will depart from the equilibrium state after the first heat treatment, and the glass may sometimes extend. The glass tends to extend more readily under an equilibrium condition at a high temperature than under an equilibrium condition at a lower temperature. In such a case, the average cooling rate in the second heat treatment may be made smaller than in the first heat treatment.

In the present invention, the heat treating temperature and the heat treating temperature maintaining period of time for the heat treatment of a glass substrate, can optionally be determined depending upon the characteristics of the laminating material. Namely, after heat treatment under a condition suitable for the laminating material, the cooling rate is properly set, whereby the degree of extensibility or shrinkage of the glass substrate can be made small and constant in each heat treatment step.

Further, the cooling rate of glass in each heat treatment is preferably controlled within a range of from 0.5° to 10° C./min. If the cooling rate is smaller than 0.5° C./min, the production efficiency tends to be poor, and on the other hand, if it is larger than 10° C./min, the possibility of heat crack or heat deformation due to the temperature distribution in the glass plane tends to be high. As mentioned above, if the temperature is lower than 400° C., the influence of the cooling rate to the strain or the degree of extensibility or shrinkage of glass tends to be small. Accordingly, depending upon the degree of extensibility or shrinkage required, there may be a case where there will be no problem even if the cooling rate is outside the above-mentioned range.

Further, it is very effective to subject the laminating material to pre-heat treatment once before lamination, in order to control the absolute value for the degree of extensibility or shrinkage of the glass substrate to be small in the first heat treatment step after lamination of the laminating material. Namely, the plurality of heat treatments in the present invention may include the pre-heat treatment prior to lamination of the laminating material.

Further, in a case where it is not possible to adjust the degree of extensibility or shrinkage to a desired level within the range of from 0.5° to 10° C./min of the average cooling rate, adjustment may sometimes be made by subjecting the glass substrate to heat treatment prior to forming the next laminating material.

The furnace to be used in the heat treatment process of the present invention may, for example, be a batch-type furnace whereby a glass substrate is introduced into the furnace every time of heat treatment, and the temperature in the furnace is changed with time, or it may be a belt type furnace, a conveyor type furnace or a walking beam furnace of a type whereby a suitable temperature distribution is formed in the furnace, and a glass substrate is transported therein at a predetermined speed.

Particularly preferred is a conveyor type furnace of a type wherein the conveyor is divided into a plurality of conveyors in the furnace, so that the time can independently be controlled in the temperature raising step, the heat treating step and the cooling step, whereby the cooling rate can simply be controlled.

As the glass substrate to be used in the present invention, preferred is one, of which the thermal expansion coefficient agrees to a common laminating material to avoid heat crack or heat deformation in the heat treatment process. For example, in the production of PDP, preferred is one having a thermal expansion coefficient of from about $70 \times 10^{-7}$ to $90 \times 10^{-7}/°C$. Further, for the same purpose, a glass having an annealing point higher than the maximum temperature during the heat treatment, is preferred.

According to the present invention, at the time of heat treating a glass substrate a plurality of times, even if heat treatment is carried out at a relatively high temperature (such as a temperature exceeding 400° C., particularly 500° C.), the absolute value for the degree of extensibility or shrinkage of the glass substrate can be suppressed to a level of at most 50 ppm, particularly at most 20 ppm, in each heat treatment. Further, in a case where heat treatment is carried out at a relatively low temperature (for example, from 300° to 450° C.), the absolute value for the degree of extensibility or shrinkage of the glass substrate can be suppressed to a level of at most 10 ppm, particularly at most 5 ppm.

Further, also the absolute value for the cumulative degree of extensibility or shrinkage of glass after laminating the laminating material, can be made to be at most 50 ppm, particularly at most 20 ppm. Further, in a case where the heat treatment is carried out at a relatively low temperature, it can be made to be at most 10 ppm, particularly at most 5 ppm.

The process of the present invention can be applied not only to the production of a display panel such as PDP or a liquid crystal display panel, but also generally to a process wherein a glass substrate is required to be heat-treated a plurality of times with high precision.

Further, the method of the present invention is preferably applied to all of the second and subsequent heat treatments. However, by applying it to at least one heat treatment, the effects of the present invention can be obtained in such heat treatment.

Now, the present invention will be described in further detail with reference to Examples. However, it should be understood that the present invention is by no means restricted by such specific Examples.

EXAMPLES 1 to 7

An aluminosilicate float glass having an annealing point of 620° C. and a thermal expansion coefficient of $83 \times 10^{-7}/°C.$, which was once subjected to heat treatment, was used as a substrate glass. The size of this glass was preliminarily measured and then heat-treated in a belt-type heat treatment furnace, and the size after the heat treatment was measured again, whereupon the degree of extensibility or shrinkage (unit: ppm) was calculated by the following formula:

(size after the heat treatment−size before the heat treatment)/(size before the heat treatment)

This operation was repeated four times, and every time, the degree of heat extensibility or shrinkage after the preceding heat treatment was obtained. Further, the temperature raising was carried out over 30 minutes from room temperature to the maximum temperature, and the retention time at the maximum temperature was 20 minutes, and natural cooling was adopted at a temperature of 400° C. or lower.

In Table 1, the heat treating temperature, the average cooling rate to 400° C. and the results of measurement of the degree of extensibility or shrinkage, are shown. Examples 1 to 5 represent cases wherein the heat treating temperature (the maximum temperature) was the same in the four heat treatments.

As shown in Examples 1 and 2, by increasing the average cooling rate in every heat treatment, it was possible to control the absolute value for the degree of extensibility or shrinkage to a range of error of at most 5 ppm in each stage. On the other hand, as shown in Examples 3 and 4, if cooling was carried out at the same rate, the results were the same as in Examples 1 and 2, respectively, in the first treatment, but thereafter, it was not possible to suppress the degree of shrinkage. Further, as shown in Example 5, if the cooling rate was increased uniformly, the degree of extension in the first heat treatment increased although the degree of shrinkage in the second and subsequent heat treatments decreased to some extent, and in all treatments, satisfactory results were not obtained.

Further, Examples 6 and 7 represent cases wherein the heat treating temperature was gradually lowered in every heat treatment. In such a case, the effects of Example 6 wherein the cooling rate was adjusted, were remarkable as compared with Example 7 wherein the cooling rate was constant. Thus, it has been confirmed that the method of the present invention is effective also in a case where the heat treating temperature is changed in each heat treatment.

Thus, by properly selecting the heat treating temperature and the average cooling rate suitable for the particular retention time, etc., it is possible to minimize non-uniformity in the degree for extensibility or shrinkage of glass and to control the absolute value thereof.

TABLE 1

| Example | | 1 | 2 | 3 | 4 | 5 | 6 | 7 |
|---|---|---|---|---|---|---|---|---|
| Heat treating | 1st | 580 | 560 | 580 | 560 | 580 | 600 | 600 |
| temp. (°C.) | 2nd | 580 | 560 | 580 | 560 | 580 | 580 | 580 |
| | 3rd | 580 | 560 | 580 | 560 | 580 | 560 | 560 |
| | 4th | 580 | 560 | 580 | 560 | 580 | 540 | 540 |
| Average | 1st | 1.5 | 2 | 1.5 | 2 | 4 | 1 | 1 |
| cooling rate | 2nd | 2.5 | 4 | 1.5 | 2 | 4 | 2 | 1 |
| (°C./min) | 3rd | 4 | 6 | 1.5 | 2 | 4 | 5 | 1 |
| | 4th | 6 | 8 | 1.5 | 2 | 4 | 10 | 1 |
| Degree of | 1st | 4 | 5 | 4 | 5 | 58 | −7 | −7 |
| extensibility or | 2nd | 2 | 4 | −27 | −18 | −18 | −7 | −52 |
| shrinkage | 3rd | 4 | −3 | −23 | −17 | −18 | −9 | −40 |
| (ppm) | 4th | 2 | −5 | −19 | −15 | −17 | −18 | −28 |

As described in the foregoing, the present invention is an extremely effective method whereby the degree of extensibility or shrinkage of glass can be controlled when heat treatment is carried out a plurality of times. That is, while the dimensional stability of a substrate has become important along with the progress in sophistication, trend for high density picture elements and trend for a large area, of a display such as PDP, it is possible to accomplish improvements in the quality and the production efficiency by the method of the present invention.

Further, the present invention is applicable not only to the production of a display but also to other production process wherein a heat treating process at a high temperature is required.

What is claimed is:

1. A method for heat treatment of a glass substrate, which comprises heat treating a glass substrate at least three times, wherein in each of a second and subsequent heat treatments, a cooling rate for cooling from a temperature maintained for a predetermined period of time for heat treatment is differentiated from a cooling rate in an immediately preceding heat treatment so as to control an absolute value for a degree of extensibility or shrinkage of the glass substrate after the heat treatment.

2. The method of claim 1, wherein the cooling rate of the glass substrate in each heat treatment is within a range of from 0.5° to 10° C./min.

3. The method of claim 1, wherein the glass substrate has a thermal expansion coefficient of from $70 \times 10^{-7}$ to $90 \times 10^{-7}$/°C.

4. The method of claim 1, which comprises heat treating the glass substrate three times.

5. The method of claim 1, which comprises heat treating the glass substrate four times.

6. A method for heat treatment of a glass substrate, which comprises heat treating a glass substrate at least three times at a temperature exceeding 400° C., wherein in each of a second and subsequent heat treatments, an average cooling rate for cooling to 400° C. from a temperature maintained for a predetermined period of time for heat treatment is set so that an absolute value for a degree of extensibility or shrinkage of the glass substrate becomes smaller than for heat treatment at a same rate as the average cooling rate to 400° C. in an immediately preceding heat treatment.

7. The method of claim 6, wherein in each of the second and subsequent heat treatments, where the glass substrate shrinks by heat treatment at the same average cooling rate to 400° C. as the average cooling rate to 400° C. in the immediately preceding heat treatment, the average cooling rate to 400° C. is set to be larger than that in the immediately preceding heat treatment, and where the glass substrate extends by heat treatment at the same average cooling rate to 400° C. as the average cooling rate to 400° C. in the immediately preceding heat treatment, the average cooling rate to 400° C. is set to be smaller than that in the immediately preceding heat treatment.

8. The method of claim 6, wherein each heat treatment is set so that the absolute value for the degree of extensibility or shrinkage of the glass substrate is at most 50 ppm.

9. The method of claim 6, wherein the cooling rate of the glass substrate in each treatment is within a range of from 0.5° to 10° C./min.

10. The method of claim 6, wherein said glass substrate has a thermal expansion coefficient of from $70 \times 10^{-7}$ to $90 \times 10^{-7}$/°C.

11. The method of claim 6, which comprises heat treating a glass substrate three times.

12. The method of claim 6, which comprises heat treating a glass substrate four times.

13. A method for heat treatment of a glass substrate, which comprises heat treating a glass substrate at least three times at a temperature exceeding 300° C., wherein in each of a second and subsequent heat treatments, an average cooling rate for cooling to room temperature from a temperature maintained for a predetermined period of time for heat treatment is set so that an absolute value for a degree of extensibility or shrinkage of the glass substrate becomes smaller than for heat treatment at a same rate as the average cooling rate to room temperature in an immediately preceding heat treatment.

14. The method of claim 13, wherein in each of the second and subsequent heat treatments, where the glass substrate shrinks by heat treatment at the same average cooling rate to room temperature as the average cooling rate to room temperature in the immediately preceding heat treatment, the average cooling rate to room temperature is set to be larger than that in the immediately preceding heat treatment, and in a case where the glass substrate extends by heat treatment at the same average cooling rate to room temperature as the average cooling rate to room temperature in the immediately preceding heat treatment, the average cooling rate to temperature is set to be smaller than that in the immediately preceding heat treatment.

15. The method of claim 13, wherein the heat treatment is conducted under atmospheric pressure, and each heat treatment is set so that the absolute value for the degree of extensibility or shrinkage of the glass substrate is at most 10 ppm.

16. The method of claim 15, wherein the absolute value for the degree of extensibility or shrinkage of the glass substrate is at most 5 ppm.

* * * * *